(12) United States Patent
Pan

(10) Patent No.: US 10,831,087 B2
(45) Date of Patent: Nov. 10, 2020

(54) ILLUMINATION SYSTEM AND PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/403,629

(22) Filed: May 6, 2019

(65) Prior Publication Data

US 2019/0346752 A1 Nov. 14, 2019

(30) Foreign Application Priority Data

May 10, 2018 (CN) .......................... 2018 1 0441174

(51) Int. Cl.
*G03B 21/20* (2006.01)
*G02B 5/02* (2006.01)
*H04N 9/31* (2006.01)
*G02B 27/14* (2006.01)
*G02B 26/00* (2006.01)

(52) U.S. Cl.
CPC ......... *G03B 21/204* (2013.01); *G02B 5/0278* (2013.01); *G02B 26/008* (2013.01); *G02B 27/141* (2013.01); *G03B 21/208* (2013.01); *H04N 9/3197* (2013.01)

(58) Field of Classification Search
CPC .. G03B 21/006; G03B 21/008; G03B 21/204; G03B 21/208; G03B 21/2013; G03B 21/2033; G03B 21/2053; G03B 21/2066
See application file for complete search history.

(56) References Cited

U.S. PATENT DOCUMENTS

| 2008/0055558 A1 | 3/2008 | Tang et al. |
| 2010/0245776 A1 | 9/2010 | Yamamoto |
| 2010/0245777 A1 | 9/2010 | Ogura |

(Continued)

FOREIGN PATENT DOCUMENTS

| CN | 102419507 | 4/2012 |
| CN | 102645826 | 8/2012 |

(Continued)

*Primary Examiner* — Sultan Chowdhury
(74) *Attorney, Agent, or Firm* — JCIPRNET

(57) ABSTRACT

An illumination system includes a blue light source, an excitation light source, a first light splitting element and a wavelength conversion element. The blue light source provides a blue light beam. The excitation light source provides an excitation light beam. The first light splitting element and the wavelength conversion element are disposed on transmission paths of the blue light beam and the excitation light beam. The wavelength conversion element includes a diffusion region and a wavelength conversion region. In a first timing period, the excitation light beam passing through the first light splitting element is transmitted to the wavelength conversion region to be converted into an excited light beam. In a second timing period, the blue light beam passing through the diffusion region is transmitted to the first light splitting element. The excited light beam includes a first red light beam and a green light beam.

24 Claims, 17 Drawing Sheets

(56) References Cited

U.S. PATENT DOCUMENTS

| | | | |
|---|---|---|---|
| 2012/0274678 A1* | 11/2012 | Oda | H04N 13/341 |
| | | | 345/691 |
| 2014/0176916 A1 | 6/2014 | Masuda | |
| 2015/0185596 A1 | 7/2015 | Hsieh et al. | |
| 2016/0004147 A1 | 1/2016 | Hu et al. | |
| 2016/0241822 A1 | 8/2016 | Takagi et al. | |
| 2017/0097560 A1* | 4/2017 | Matsubara | G02B 27/123 |
| 2018/0129127 A1* | 5/2018 | Wakabayashi | G02B 26/008 |
| 2018/0149957 A1* | 5/2018 | Maeda | G02B 26/008 |

FOREIGN PATENT DOCUMENTS

| | | |
|---|---|---|
| CN | 102650814 | 8/2012 |
| CN | 103888702 | 6/2014 |
| CN | 103968332 | 8/2014 |
| CN | 104020633 | 9/2014 |
| JP | 2005173019 | 6/2005 |
| JP | 2011128521 | 6/2011 |
| JP | 2012008177 | 1/2012 |
| TW | 201348747 | 12/2013 |
| TW | I605295 | 11/2017 |

* cited by examiner

ILLUMINATION SYSTEM AND PROJECTION APPARATUS

CROSS-REFERENCE TO RELATED APPLICATION

This application claims the priority benefit of China application serial no. 201810441174.X, filed on May 10, 2018. The entirety of the above-mentioned patent application is hereby incorporated by reference herein and made a part of this specification.

BACKGROUND

Field of the Invention

The invention is directed to an optical system and an optical apparatus and more particularly, to an illumination system and a projection apparatus.

Description of Related Art

A projection apparatus is a display apparatus for generating a large-sized image and keeps in progress along with the development and innovation of technologies. According to an imaging principle of the projection apparatus, an illumination light beam generated by an illumination system is converted into an image light beam by a light valve, and afterwards, the image light beam passing through a projection lens is projected onto a target object (e.g., a screen or a wall) to form a projection image.

In addition, the illumination system, under market requirements for brightness, color saturation, service life, non-toxic environmental protection and so on, has been developed all the way from an ultra-high-performance lamp (UHP lamp) and a light-emitting diode (LED) to the most advanced laser diode (LD) light source. However, in the illumination system, a relatively cost-effective method for generating red and green light is generating yellow and green light by exciting phosphor powders of a phosphor wheel using a blue LD, which is then filtered by optical elements to obtain red light or green light for use.

However, in a commonly known illumination system structure, two or more color wheels, such as phosphor wheels or diffusion color wheels are usually disposed, while two or more color wheels indicates that two or more corresponding parts including motor devices, driving modules and circuits are required. Consequently, the cost keeps high, the volume cannot be reduced, and an issue of poor heat dissipation also exists.

The information disclosed in this "Description of Related Art" section is only for enhancement of understanding of the background of the described technology and therefore it may contain information that does not form the prior art that is already known to a person of ordinary skill in the art. Further, the information disclosed in the "Description of Related Art" section does not mean that one or more problems to be resolved by one or more embodiments of the invention were acknowledged by a person of ordinary skill in the art.

SUMMARY

The invention provides an illumination system and a projection apparatus capable of simplifying a structure and reducing a volume.

Other features and advantages of the invention can be further understood by the technical features disclosed in the invention.

To achieve one, part, or all of the objectives aforementioned or other objectives, an embodiment of the invention provides an illumination system including a blue light source, an excitation light source, a first light splitting element and a wavelength conversion element. The blue light source is configured to provide a blue light beam. The excitation light source is configured to provide an excitation light beam. The first light splitting element is disposed on transmission paths of the blue light beam and the excitation light beam. The wavelength conversion element is disposed on the transmission paths of the blue light beam and the excitation light beam and includes a diffusion region and a wavelength conversion region. The illumination system has a first timing period and a second timing period. In the first timing period, the excitation light beam passing through the first light splitting element is transmitted to the wavelength conversion region to be converted into an excited light beam. In the second timing period, the blue light beam passing through the diffusion region is transmitted to the first light splitting element, and the excited light beam includes a first red light beam and a green light beam.

To achieve one, part, or all of the objectives aforementioned or other objectives, another embodiment of the invention provides a projection apparatus for providing a projection light beam. The projection apparatus includes an illumination system, at least one light valve and a projection lens module. The illumination system provides an illumination light beam and includes a blue light source, an excitation light source, a first light splitting element and a wavelength conversion element. The blue light source is configured to provide a blue light beam. The excitation light source is configured to provide an excitation light beam. The first light splitting element is disposed on transmission paths of the blue light beam and the excitation light beam. The wavelength conversion element is disposed on the transmission paths of the blue light beam and the excitation light beam and includes a diffusion region and a wavelength conversion region. The at least one light valve is disposed on a transmission path of the illumination light beam, and configured to convert the illumination light beam into at least one image light beam. The projection lens module is disposed on a transmission path of the at least one image light beam, and configured to form the at least one image light beam to the projection light beam. The illumination system has a first timing period and a second timing period. In the first timing period, the excitation light beam passing through the first light splitting element is transmitted to the wavelength conversion region to be converted into an excited light beam. In the second timing period, the blue light beam passing through the diffusion region is transmitted to the first light splitting element, and the excited light beam includes a first red light beam and a green light beam.

To achieve one, part, or all of the objectives aforementioned or other objectives, another embodiment of the invention provides an operation method of an illumination system, including the following steps. The illumination system as described above is provided. In the first timing period, the blue light source is changed to a turned-off state or a power-saving state, the excitation light source is changed to a turned-on state, so as to generate a first red light beam and a green light beam. In the second timing period, the excitation light source is changed to the turned-off state or the power-saving state, and the blue light source is changed to the turned-on state, so as to generate a blue light beam.

To achieve one, part, or all of the objectives aforementioned or other objectives, another embodiment of the invention provides an operation method of a projection apparatus, including the following steps. The projection apparatus as described above is provided. In the first timing period, the blue light source is changed to a turned-off state or a power-saving state, the excitation light source is changed to a turned-on state, so as to generate a first red light beam and a green light beam. In the second timing period, the excitation light source is changed to the turned-off state or the power-saving state, and the blue light source is changed to the turned-on state, so as to generate a blue light beam.

Based on the above, the embodiments of the invention achieve at least one of the following advantages or effects. In the embodiments of the invention, the wavelength conversion element is disposed on the transmission paths of the blue light beam and the excitation light beam and includes the diffusion region and the wavelength conversion region. Thus, the illumination system can provide the illumination light beam without being additionally disposed with a color wheel apparatus, so as to simplify the structure of the projection apparatus and reduce the volume thereof.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
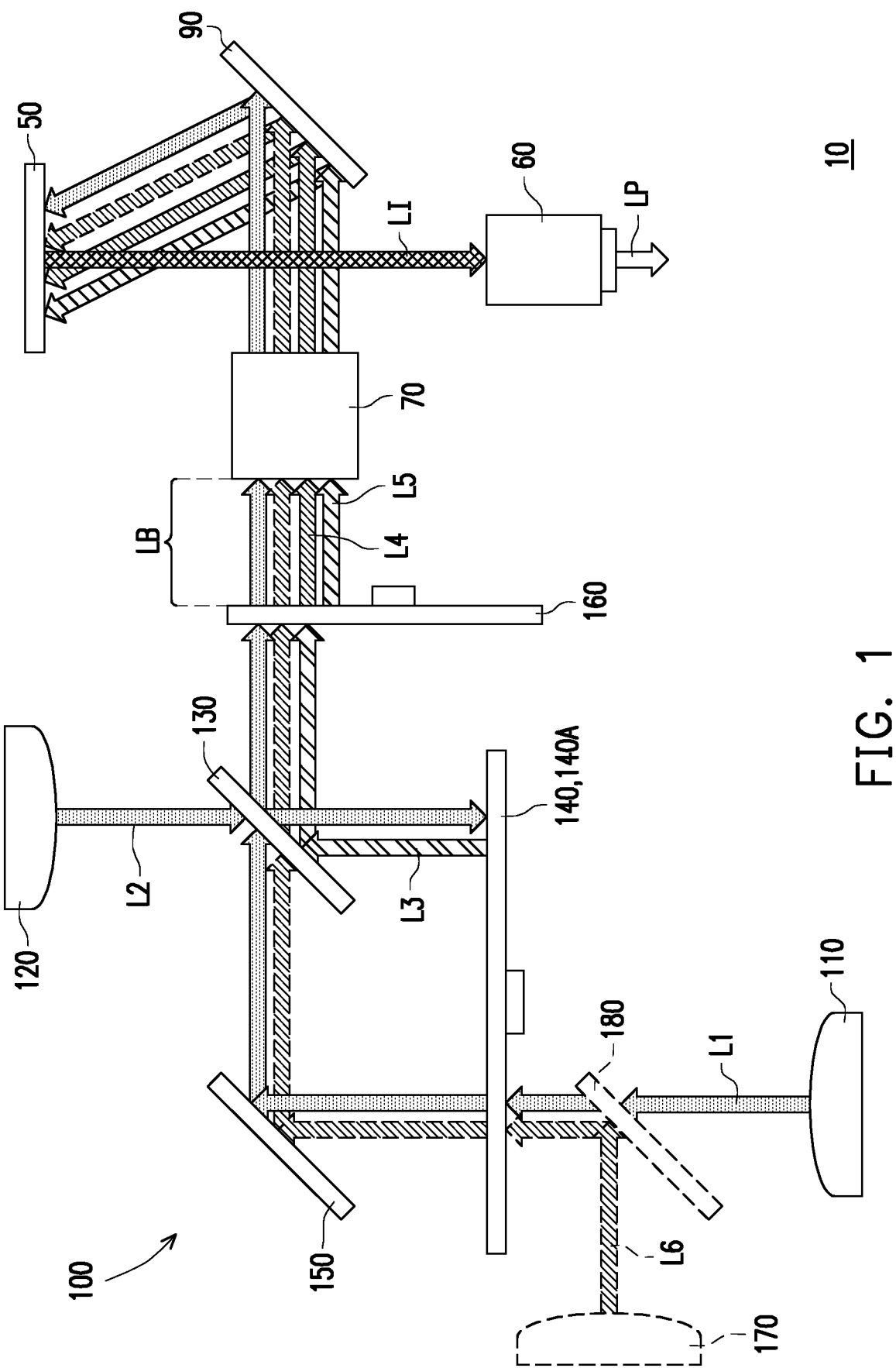
FIG. 1 is a schematic view illustrating a projection system according to an embodiment of the invention.

FIG. 1 is a schematic view illustrating a projection system according to an embodiment of the invention. Referring to FIG. 1, in the embodiment, a projection apparatus 10 is configured to provide a projection light beam LP. Specifically, the projection apparatus 10 includes an illumination system 100, at least one light valve 50, a projection lens module 60 and a light uniformizing element 70. The illumination system 100 is configured to provide an illumination light beam LB. The light valve 50 is disposed on a transmission path of the illumination light beam LB, and configured to convert the illumination light beam LB into at least one image light beam LI. In other words, the so-called illumination light beam LB refers to a light beam which is provided to the light valve 50 by the illumination system 100 at any time, for example, a blue light beam L1 provided by a blue light source, an excited light beam L3 converted by a wavelength conversion element 140 or a combination thereof. The projection lens module 60 is disposed on a transmission path of the image light beam LI, and configured to form the image light beam LI to the projection light beam LP. The projection light beam LP is employed to be projected onto a projection target (not shown), for example, a screen or a wall.

In the embodiment, the light valve 50 is a reflective optical modulator, for example, a liquid crystal on silicon (LCoS) panel or a digital micro-mirror device (DMD). In some embodiments, the light valve 50 may also be a transmissive optical modulator, for example, a transparent liquid crystal panel, an electro-optical modulator, a maganeto-optic modulator or an acousto-optic modulator (AOM). The aspect and the type of the light valve 50 are not particularly limited in the invention. Regarding the method for converting the illumination light beam LB into the image light beam LI by the light valve 50, teaching, suggestion and implementation instructions with respect to the detailed steps and the implementation thereof may be obtained based on the common knowledge in the technical field and thus, will not be repeated. In the embodiment, the number of at least one light valve 50 is one, for example, the projection apparatus 10 using a single DMD (1-DMD). However, the number may be plural in other embodiments, which is not limited in the invention.

The projection lens module 60 includes, for example, a combination of one or more optical lenses having diopters, for example, non-planar lenses, such as bi-concave lenses, lenticular lenses, meniscus lenses, convex-concave lenses, plano-convex lenses, and plano-concave lenses in various kinds of combinations. In an embodiment, the projection lens module 60 may also include a planar optical lenses for projecting the image light beam LI from the light valve 50 to a projection target in a reflective or a transmissive manner. The aspect and the type of the projection lens module 60 are not particularly limited in the invention.

The light uniformizing element 70 is disposed on the transmittance path of the illumination light beam LB, and configured to adjust a light-spot shape of the illumination light beam LB, such that the light-spot shape of the illumination light beam LB may meet a shape (e.g., a rectangular shape) of an working region of the light valve 50, and light-spots everywhere may have consistent or similar light intensity. In the embodiment, the light uniformizing element 70 is, for example, an integrator. However, in other embodiments, the light uniformizing element 70 may also be any other suitable optical element, but the invention is not limited thereto.

Additionally, in some embodiments, the projection apparatus 10 may further selectively include a condensing element (not shown) and a reflection element 90. The condensing element and the reflection element 90 are configured to guide the illumination light beam LB emitted from the illumination system 100 to the light valve 50. However, the invention is not limited thereto, and and in other embodiments, the illumination light beam LB may also be guided to the light valve 50 by other optical elements.

The illumination system 100 includes a blue light source 110, an excitation light source 120, a first light splitting element 130, a wavelength conversion element 140 and a light filter element 160. A reflection element 150 may be selectively disposed for guiding a light path. To be detailed, the blue light source 110 provides the blue light beam L1, and the excitation light source 120 provides an excitation light beam L2. In the embodiment, the blue light source 110 and the excitation light source 120 are laser diodes (LDs). However, in other embodiments, the blue light source 110 and the excitation light source 120 may be light-emitting diodes (LEDs) or organic light emitting diodes (OLEDs). Specifically, all light sources which meet requirements in an actual design may be implemented, the aspects and the types of the blue light source 110, the excitation light source 120 and other light sources that will be described below are not particularly limited in the invention.

In the embodiment, the blue light beam L1 is, for example, a blue light beam with a wavelength of 460 nanometers (nm), and the excitation light beam L2 is, for example, a blue light beam with a wavelength of 445 nm. In other words, the wavelength of the blue light beam L1 is greater than that of the excitation light beam L2. In other embodiments, the wavelength of the blue light beam L1 may also be the same as that of the excitation light beam L2, which is not limited in the invention. In the embodiment, the blue light beam L1 is employed to provide a blue light portion of the projection light beam LP, and the excitation light beam L2 is employed to excite a wavelength conversion material of the wavelength conversion element 140 to provide a yellow light portion, a green light portion and a red light portion of the projection light beam LP. In this way, an issue of a purplish image resulted from a provided purplish blue light part may be prevented, so as to improve optical quality of the projection apparatus 10. In the embodiment, the blue light source 110 and the excitation light source 120 are respectively located at two opposite sides of the wavelength conversion element 140.

Figure 2:
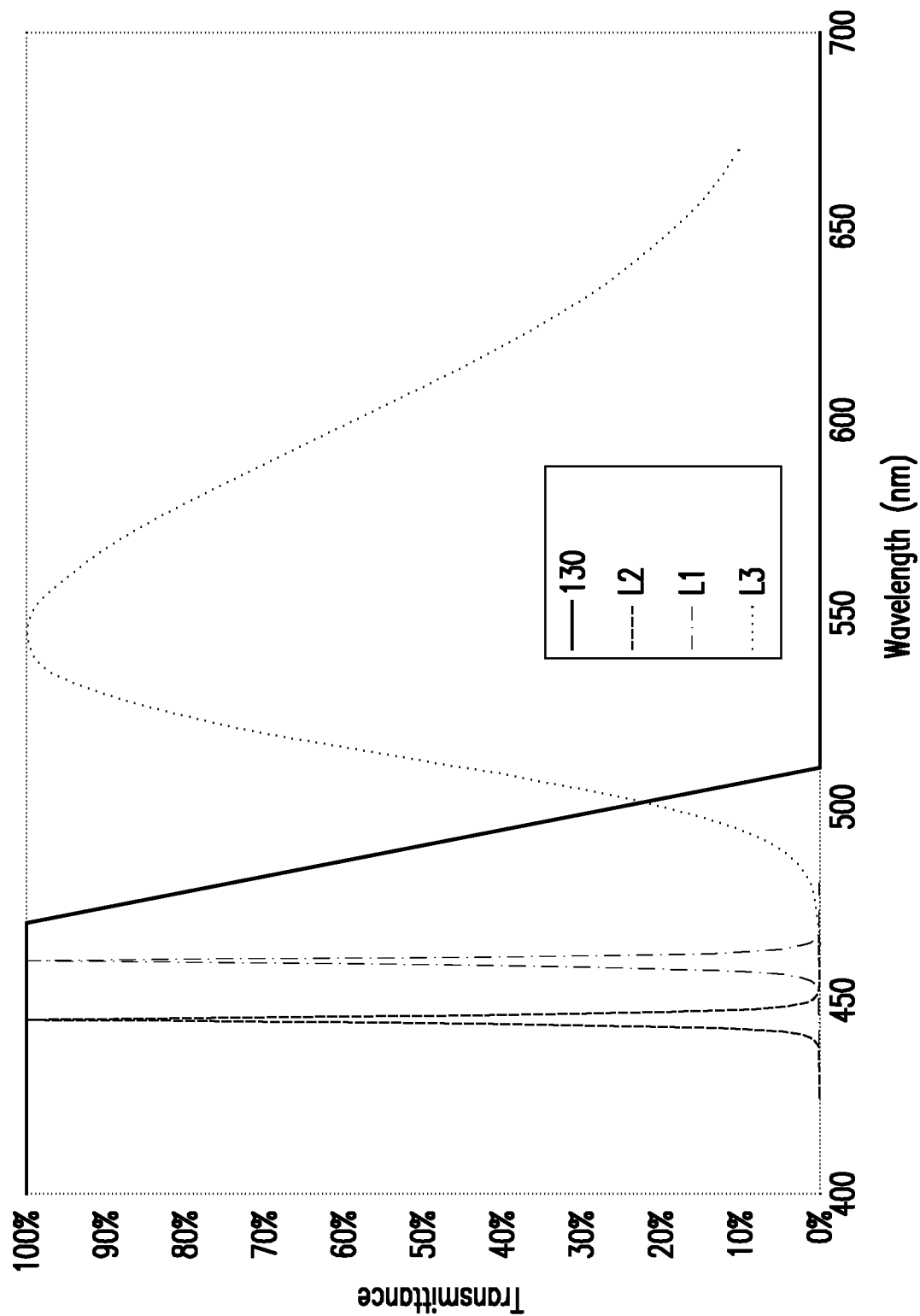
FIG. 2 is a spectrum diagram of the first light splitting element of the projection apparatus depicted in FIG. 1.

FIG. 2 is a spectrum diagram of the first light splitting element of the projection apparatus depicted in FIG. 1. Referring to FIG. 1 and FIG. 2, the first light splitting element 130 is disposed on transmission paths of the blue light beam L1 and the excitation light beam L2. In the embodiment, the first light splitting element 130 is a dichroic mirror with yellow reflect (DMY). However, the invention is not limited thereto, and according to other embodiments, the first light splitting element 130 may be other types or aspects, which will be described with reference to other embodiments below.

Figure 3A:
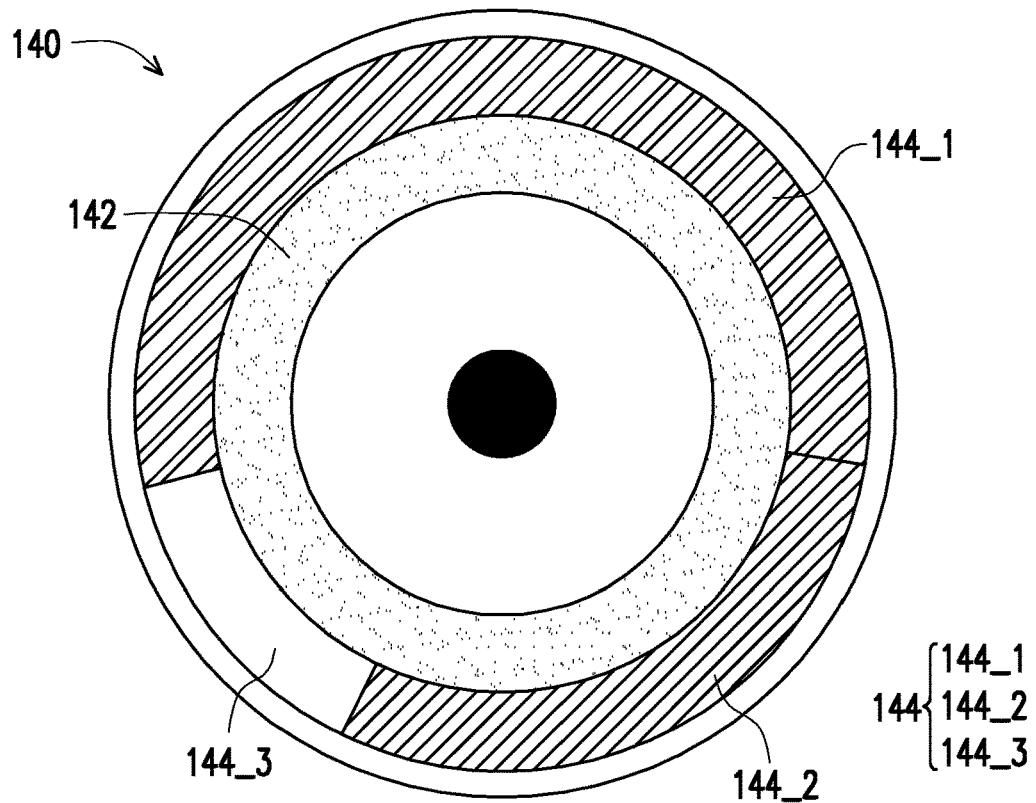
FIG. 3A and FIG. 3B are respectively schematic top-view diagrams of the wavelength conversion element of the projection apparatus depicted in FIG. 1 according to different embodiments of the invention.
Figure 3B:
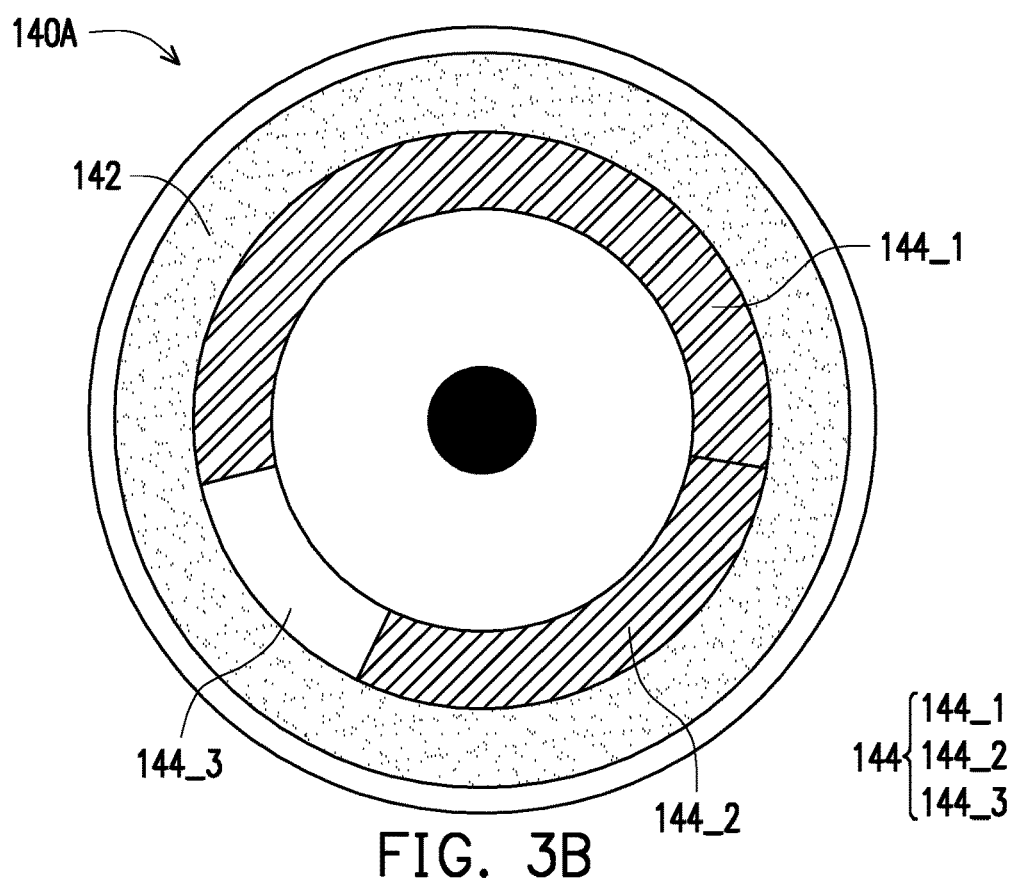

FIG. 3A and FIG. 3B are respectively schematic top-view diagrams of the wavelength conversion element of the projection apparatus depicted in FIG. 1 according to different embodiments of the invention. Referring to FIG. 1 and FIG. 3A first, in the embodiment, the wavelength conversion element 140 is disposed on the transmission paths of the blue light beam L1 and the excitation light beam L2, and includes a diffusion region 142 and a wavelength conversion region 144. The diffusion region 142 and the wavelength conversion region 144 are distributed in a concentric circle manner on the wavelength conversion element 140. A wavelength conversion material is provided on the wavelength conversion element 140 for converting the excitation light beam L2 into an excited light beam L3. To be detailed, in the embodiment, the blue light beam L1 may be diffused and uniformized by the diffusion region 142. The wavelength conversion region 144 includes a first conversion area 144_1, a second conversion area 144_2 and a non-excitation area 144_3. The first conversion area 144_1 includes, for example, a yellow-light conversion material employed to convert the excitation light beam L2 into the excited light beam L3 presenting yellow light. The second conversion area 144_2 includes, for example, a green-light conversion material employed to convert the excitation light beam L2 into the excited light beam L3 presenting green light. The non-excitation area 144_3 is, for example, an area provided with no wavelength conversion material and thus, the wavelength conversion material may be further saved, but the invention is not limited thereto.

Figure 4A:
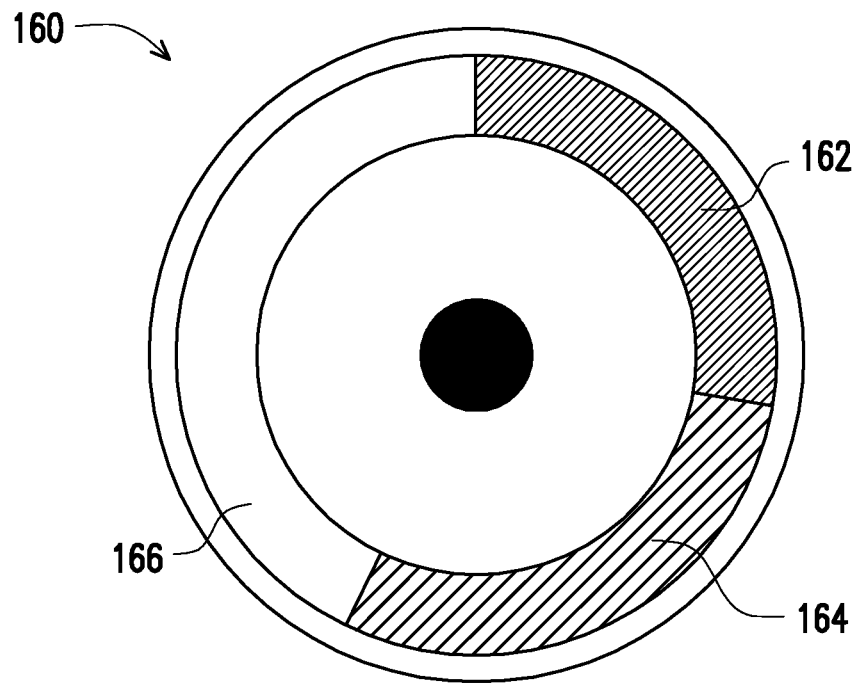
FIG. 4A and FIG. 4B are respectively schematic top-view diagrams of the light filter element of the projection apparatus depicted in FIG. 1 according to different embodiments of the invention.
Figure 4B:
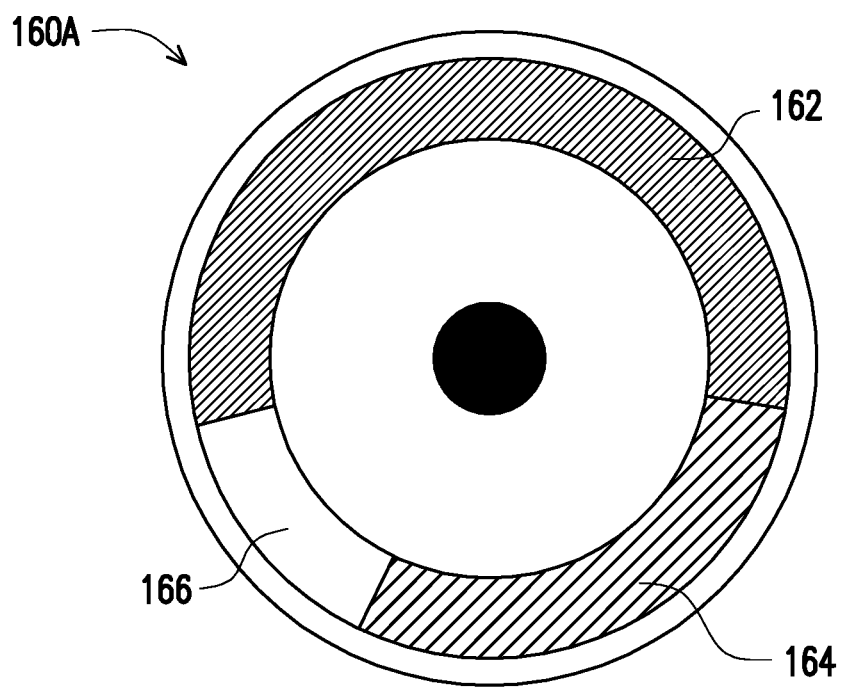

FIG. 4A and FIG. 4B are respectively schematic top-view diagrams of the light filter element of the projection apparatus depicted in FIG. 1 according to different embodiments of the invention. Referring to FIG. 1 and FIG. 4A first, the light filter element 160 is disposed on the transmission path of the blue light beam L1 and a transmission path of the excited light beam L3. The excited light beam L3 is transmitted to the first light splitting element 130 and reflected to the light filter element 160 to generate the red, the green or the yellow light portion. To be detailed, in the embodiment, the light filter element 160 includes, for example, a first light filter region 162, a second light filter region 164 and a transparent region 166. The first light filter region 162 is, for example, a red-light filter region employed to allow the red light portion of the excited light beam L3 to pass through to generate a first red light beam L4. The second light filter region 164 is, for example, a green-light filter region employed to allow the green light portion of the excited light beam L3 to pass through to generate a green light beam L5. In other words, the illumination system 100 combines commonly known diffusion color wheel and phosphor wheel, thereby, providing the illumination light beam LB without any additionally disposed color wheel device, which may simplify the structure of the projection apparatus 10 and reduce its volume.

Figure 5A:
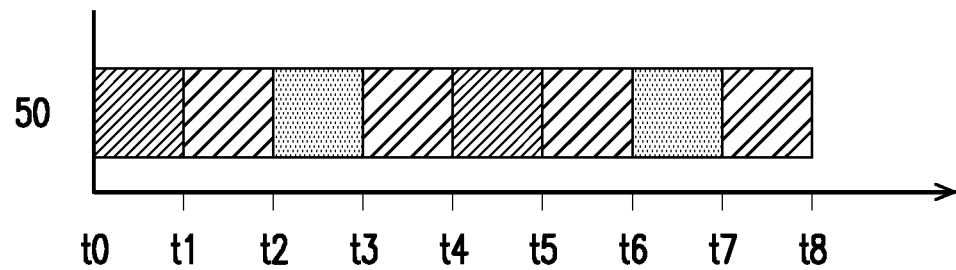
FIG. 5A to FIG. 5C are respectively timing charts of the projection apparatus depicted in FIG. 1 according to different embodiments of the invention.
Figure 5B:
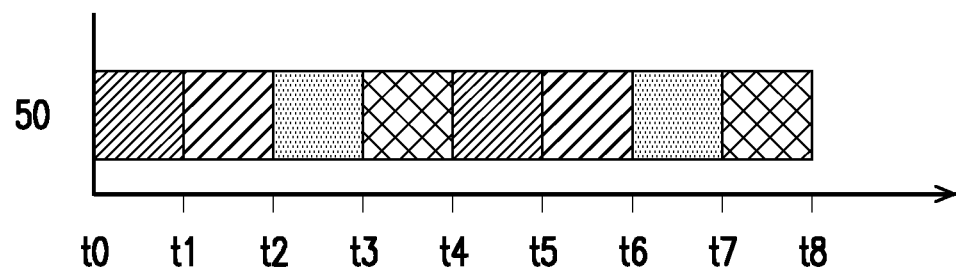
Figure 5C:
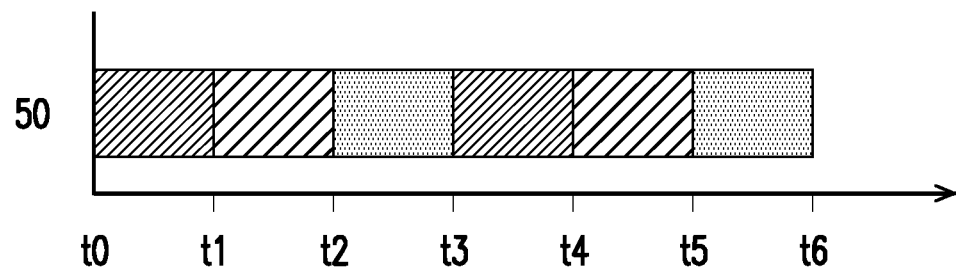

FIG. 5A to FIG. 5C are respectively timing charts of the projection apparatus depicted in FIG. 1 according to different embodiments of the invention. Referring to FIG. 1, FIG. 3A, FIG. 4A and FIG. 5A, in the embodiment, the illumination system 100 has a first timing period (t0-t2) and a second timing period (t2-t3). In the first timing period, the excitation light beam L2 passing through the first light splitting element 130 is transmitted to the wavelength conversion region 144 to be converted into the excited light beam L3. The excited light beam L3 includes the first red light beam L4 and the green light beam L5. In the second timing period, the blue light beam L1 pass through the diffusion region 142 and the first light splitting element 130.

To be detailed, in the embodiment, the illumination system 100 further includes a third timing period (t3-t4), the first timing period comprises a first sub timing period (t0-t1) and a second sub timing period (t1-t2), and the blue light source 110 and the excitation light source 120 are respectively changed to a turned-on, a turned-off or a power saving state according to the timing periods, such that the light beam received by the light valve 50 (which is the illumination light beam LB received by the illumination system 100) is changed according to the timing periods, as illustrated in FIG. 4A.

Specifically, in the first timing period, the blue light source 110 is in the turned-off state or the power saving state, and in the first timing period, the excitation light beam L2 emitted by the excitation light source 120 passing through the first light splitting element 130 is transmitted to the first conversion area 144_1 of the wavelength conversion element 140 to generate a portion of the excited light beam L3 (i.e., a first excited light beam). The portion of the excited light beam L3 (i.e., the first excited light beam) which is generated by the wavelength conversion element 140 is transmitted to the first light splitting element 130, reflected by the first light splitting element 130 and passes through the first light filter region 162 of the light filter element 160 to generate the red light portion of the illumination light beam LB (i.e., the first red light beam L4).

In the second sub timing period, the excitation light beam L2 emitted by the excitation light source 120 passing through the first light splitting element 130 is transmitted to the second conversion area 144_2 of the wavelength conversion element 140 to generate another portion of the excited light beam L3 (i.e., a second excited light beam). The aforementioned another portion of the excited light beam L3 (i.e., the second excited light beam) which is generated by the wavelength conversion element 140 is transmitted to the first light splitting element 130, reflected by the first light splitting element 130 and passes through the second light filter region 164 of the light filter element 160 to generate the green light portion of the illumination light beam LB (i.e., the first red light beam L5).

In the second timing period, the excitation light source 120 is in the turned-off state or the power saving state, and the blue light beam L1 emitted by the blue light source 110 sequentially passes through the diffusion region 142 of the wavelength conversion element 140 and the first light splitting element 130 to generate the blue light portion of the illumination light beam LB. Thus, the blue light portion of the illumination light beam LB may pass through the diffusion region 142 to be diffused and uniformized.

In the third timing period, the blue light source 110 is in the turned-off state or the power saving state, and the excitation light beam L2 emitted by the excitation light source 120 passing through the first light splitting element 130 is transmitted to the first conversion area 144_1 of the wavelength conversion element 140 to generate the excited light beam L3. The excited light beam L3 generated by the wavelength conversion element 140 is transmitted to the first light splitting element 130, reflected by the first light splitting element 130 and passes through the transparent region 166 of the light filter element 160 to generate a yellow light beam (not shown) to the illumination light beam LB. Thus, in the third timing period of the embodiment, the excitation light source 120 may further provide the yellow light beam to the light valve 50, such that the projection light beam LP provided by the the projection apparatus 10 may further have preferable brightness.

On the other hand, referring to FIG. 5B, in the third timing period of the embodiment described above, both the blue light source 110 and the excitation light source 120 may be simultaneously in the turned-on state. Specifically, in this timing period, the blue light beam L1 and the excited light beam L3 both simultaneously pass through the transparent region 166 of the light filter element 160 to generate a white light beam to the illumination light beam LB. In other words, in the third timing period, the blue light portion provided by the blue light source 110 and the yellow light portion provided by the excitation light source 120 are mixed into white light, as illustrated in FIG. 5B. In this way, the projection light beam LP provided by the the projection apparatus 10 may have more preferable brightness and optical quality.

Then, refer to FIG. 1, FIG. 3B, FIG. 4B, and FIG. 5 simultaneously. Being different from the embodiment described above, in the embodiment, the wavelength conversion element 140 in the illumination system 100 may be replaced by a wavelength conversion element 140A, the light filter element 160 may be replaced by a light filter element 160A, and the illumination system 100 has only a first sub timing period, a second sub timing period and a second timing period, as illustrated in FIG. 5C.

To be detailed, the operation manner of the illumination system 100 of the embodiment in the first timing period and the second timing period is similar to the operation manner in the first sub timing period, the second sub timing period and the second timing period in the embodiment illustrated in FIG. 5A or FIG. 5B. However, the difference therebetween lies in that the wavelength conversion element 140A of the embodiment is disposed in replacement for the diffusion region 142 and the wavelength conversion region 144 in the wavelength conversion element 140 in the embodiment described above, and the first light filter region 162 and the transparent region 166 in the light filter element 160A may be disposed in a ratio is different from that in the light filter element 160. Thus, regarding the illumination system 100 of the embodiment providing the red, the green and the blue light portions of the illumination light beam LB respectively in the first sub timing period, the second sub timing period and the second timing period, teaching, suggestion and implementation instructions with respect to the detailed steps and the implementation thereof may be obtained based on the common knowledge in the technical field and thus, will not be repeated.

Figure 6:
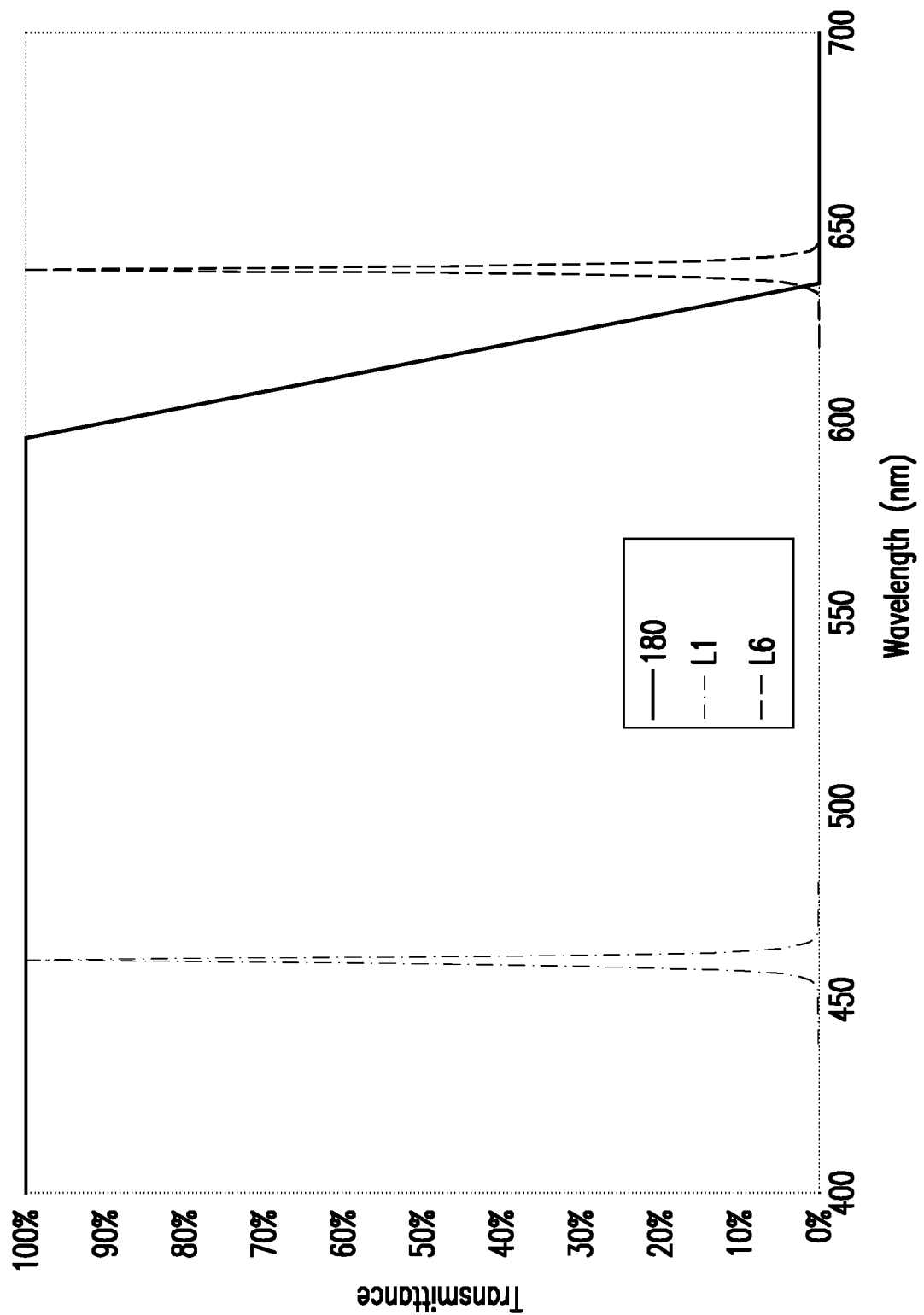
FIG. 6 is a spectrum diagram of a second light splitting element of the projection apparatus depicted in FIG. 1.
Figure 7:
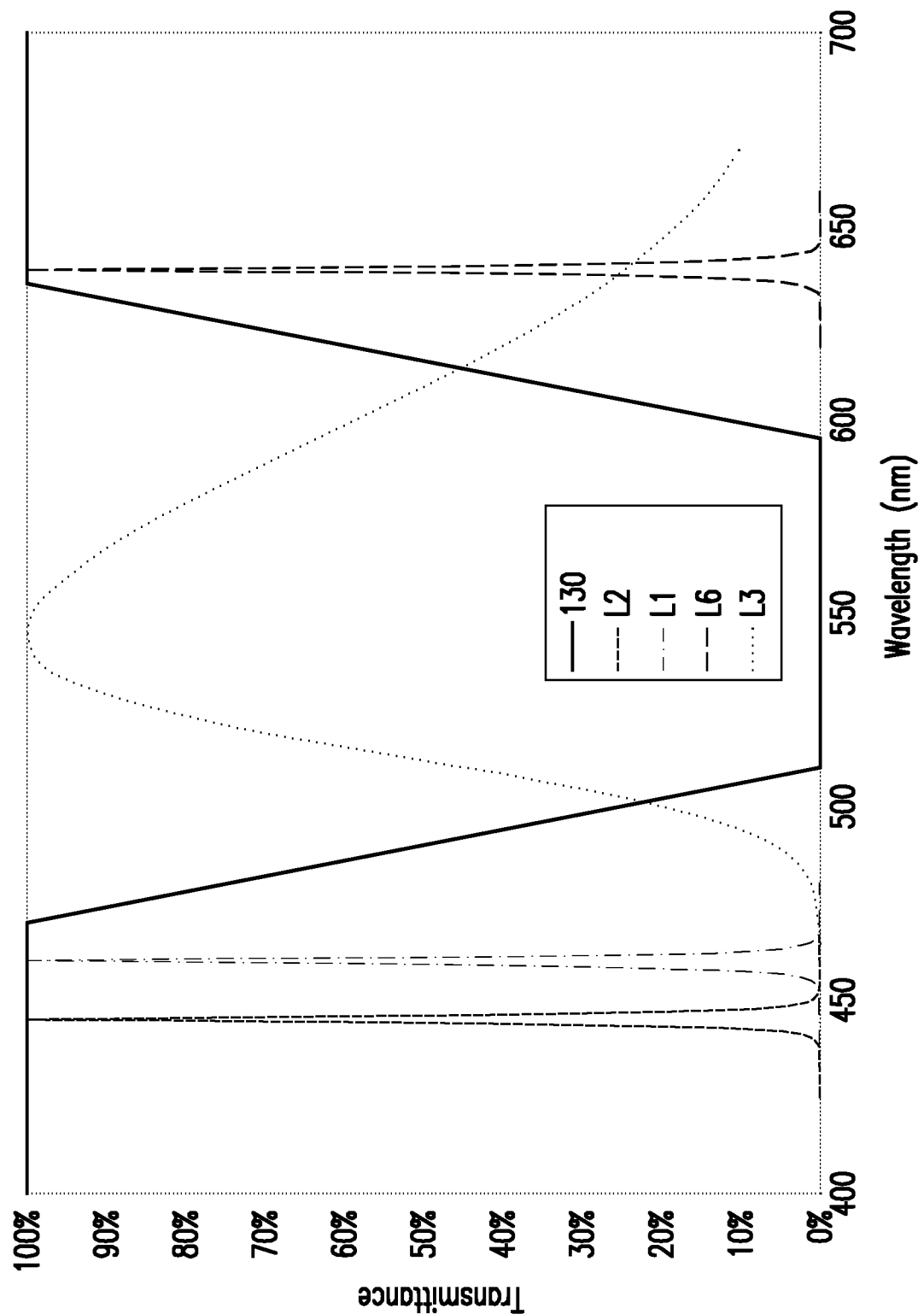
FIG. 7 is a spectrum diagram of the first light splitting element of the projection apparatus depicted in FIG. 1 according to another embodiment of the invention.

FIG. 6 is a spectrum diagram of a second light splitting element of the projection apparatus depicted in FIG. 1. FIG. 7 is a spectrum diagram of the first light splitting element of the projection apparatus depicted in FIG. 1 according to another embodiment of the invention. Referring to FIG. 1, FIG. 6 and FIG. 7, in the embodiment, the illumination system 100 may further include a red light source 170 and a second light splitting element 180. The red light source 170 provides a second red light beam L6. The second light splitting element 180 is a dichroic mirror with red reflect (DMR), as illustrated in FIG. 6, and is disposed on the transmission path of the blue light beam L1 and a transmission path of the second red light beam L6. The first light splitting element 130 selects a dichroic mirror with green and orange reflect (DMGO), as illustrated in FIG. 7, and the first light splitting element 130 and the second light splitting element 180 are respectively located at two opposite sides of the wavelength conversion element 140.

In the embodiment, the turned-on state of the red light source 170 may be the same as that of the blue light source 110 in any embodiment described above, and as such, the second red light beam L6 is reflected by the second light splitting element 180 and passes through the diffusion region 142, so as to provide an additional red light portion of the illumination light beam LB. In this way, in a scenario which emphasizes color rendering (e.g., a home theater scenario), the projection light beam LP provided by the the projection apparatus 10 may have more preferable color saturation and optical quality. In some embodiments, the second light splitting element 180 may also selects a dichroic mirror with red transmission and blue reflect, but the the invention is not limited thereto.

Figure 8:
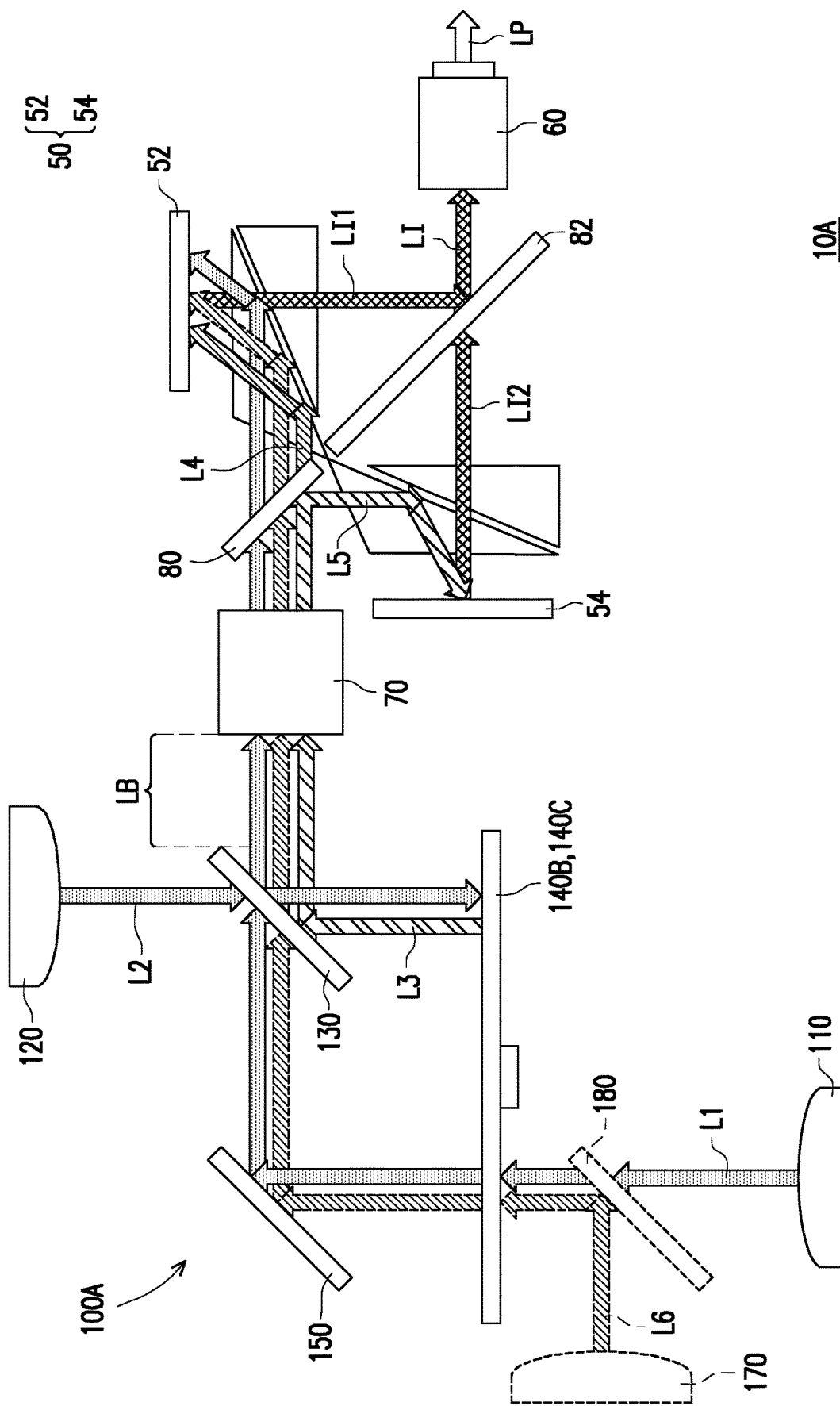
FIG. 8 is a schematic diagram illustrating a projection system according to another embodiment of the invention.
Figure 9A:
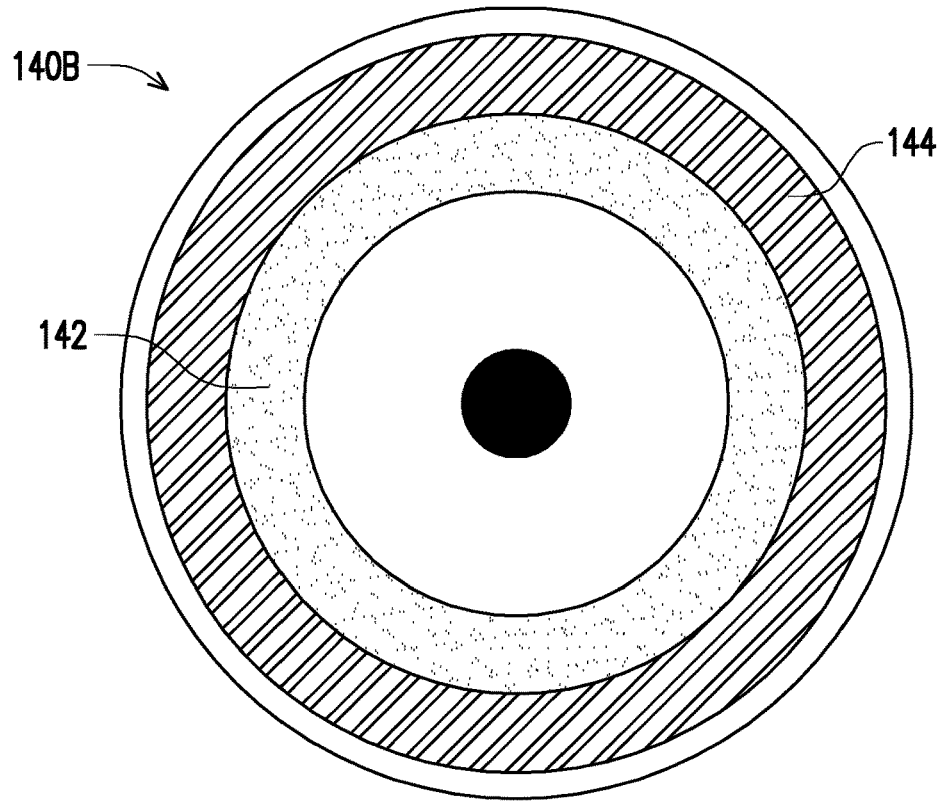
FIG. 9A and FIG. 9B are respectively schematic top-view diagrams of the wavelength conversion element of the projection apparatus depicted in FIG. 8 according to different embodiments of the invention.
Figure 9B:
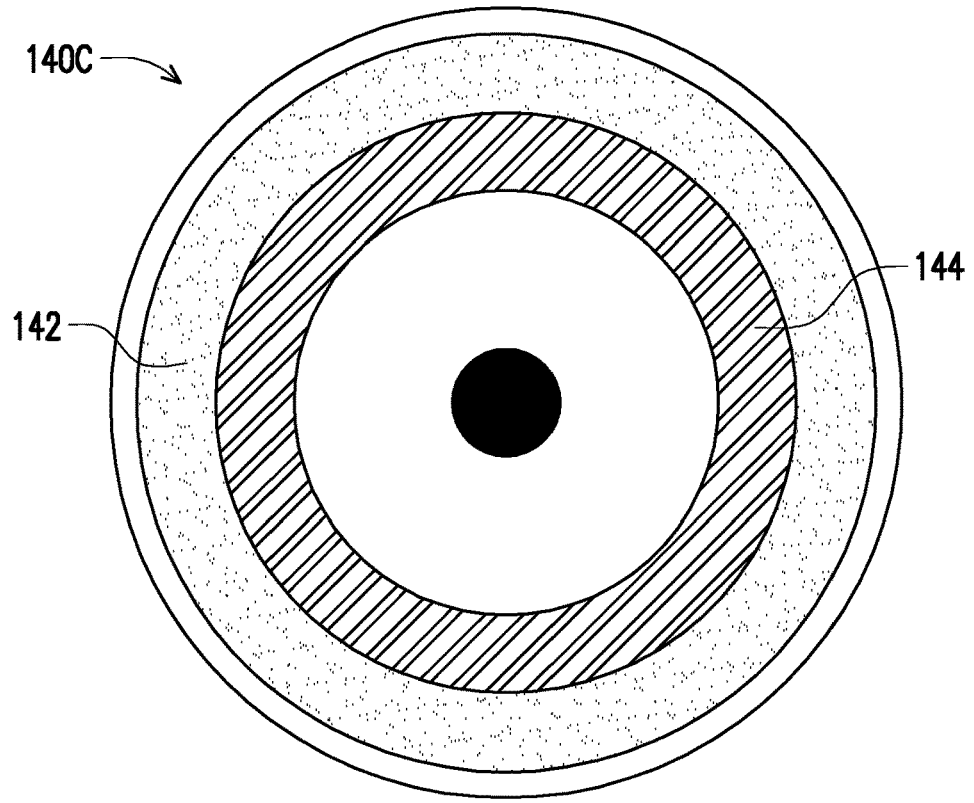
Figure 10A:
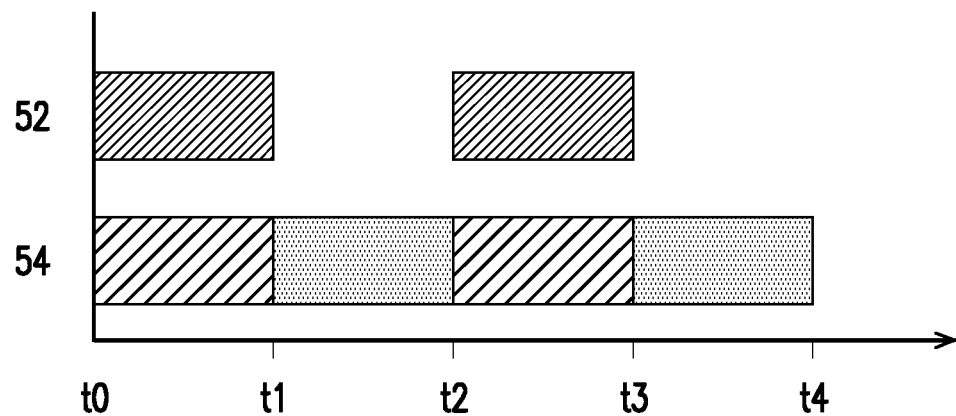
FIG. 10A to FIG. 10B are respectively timing charts of the projection apparatus depicted in FIG. 8 according to different embodiments of the invention.
Figure 10B:
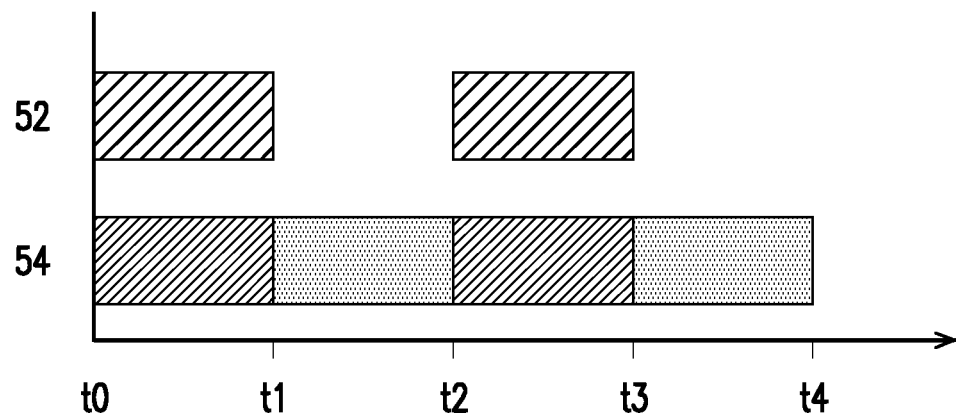

FIG. 8 is a schematic diagram illustrating a projection system according to another embodiment of the invention. Referring to FIG. 8, FIG. 9A and FIG. 9B are respectively schematic top-view diagrams of the wavelength conversion element of the projection apparatus depicted in FIG. 8 according to different embodiments of the invention, and FIG. 10A to FIG. 10B are timing charts of the projection apparatus depicted in FIG. 8 according to different embodiments of the invention. Referring to FIG. 8 to FIG. 10B, a projection apparatus 10A of the embodiment is similar to the projection apparatus 10 illustrated in FIG. 1. However, the difference therebetween is as follows. In the embodiment, the at least one light valve 50 of the projection apparatus 10A includes a first light valve 52 and a second light valve 54, for example, the projection apparatus 10A using dual DMDs (2-DMDs). In addition, the projection apparatus 10A further includes at least one light filter 80 disposed on the transmission path of the excited light beam L3, and configured to allow one of the first red light beam L4 and the green light beam L5 to pass through and transmit the one to the first light valve 52, and reflect the other one and transmit the other one to the second light valve 54. Besides, in the embodiment, each of the diffusion region 142 and the wavelength conversion region 144 of a wavelength conversion element 140B is a single continuous region. In other words, the wavelength conversion region 144 has only one single conversion area, as illustrated in FIG. 9A. Thus, the manufacturing process of the wavelength conversion element 140B may be simplified. In other embodiments, a wavelength conversion element 140C may also be selected, which is different from the wavelength conversion element 140B in that the diffusion region 142 and the wavelength conversion region 144 are disposed in the wavelength conversion element 140B in an alternative manner, as illustrated in FIG. 9B, but the invention is not limited thereto.

In the embodiment, an illumination system 100A has the first timing period (t0-t1) and the second timing period (t1-t2), and the blue light source 110 and the excitation light source 120 are respectively changed to the turned-on, the turned-off or the power saving state according to the timing periods, such that the light beam received by the first light valve 52 and the second light valve 54 (which is the illumination light beam LB received by the illumination system) is changed according to the timing periods, as illustrated in FIG. 10A and FIG. 10B.

To be detailed, in the first timing period, the blue light source 110 is in the turned-off state or the power saving state, and the excitation light beam L2 passing through the first light splitting element 130 is transmitted to the wavelength conversion region 144 of the wavelength conversion element 140B to generate the excited light beam L3. The third light beam L3 is reflected by the first light splitting element 130 to generate the red and the green light portions of the illumination light beam LB. Thereafter, a part of the illumination light beam LB passes through the light filter 80 to generate the first red light beam L4, and another part thereof is reflected by the light filter 80 to generate the green light beam L5. The first red light beam L4 is guided by an optical element to the first light valve 52, and the green light beam L5 is guided by the optical element to the first light valve 54, as illustrated in FIG. 10A. Thereafter, a first sub image light beam LI1 and a second sub image light beam LI2 generated by the first light valve 52 and the second light valve 54 are integrated as a part of the image light beam LI by the light filter 80 and is transmitted to the projection lens module 60. However, in another embodiment, the red light portion of the illumination light beam LB may be reflected by the light filter 80 and transmitted to the second light valve 54, while the green light portion of the illumination light beam LB may pass through the light filter 80 and be transmitted to the first light valve 52, as illustrated in FIG. 10B, but the invention is not limited thereto.

In the second timing period, the excitation light source 120 is in the turned-off state or the power saving state, and the blue light beam L1 emitted by the blue light source 110 sequentially passes through the diffusion region 142 and the first light splitting element 130 to generate the blue light portion of the illumination light beam LB, passes through the light filter 80 and is transmitted to the first light valve 52. In some embodiments, the blue light portion of the illumination light beam LB may be reflected to the second light valve 54 by the light filter 80, but the invention is also not limited thereto.

Figure 11:
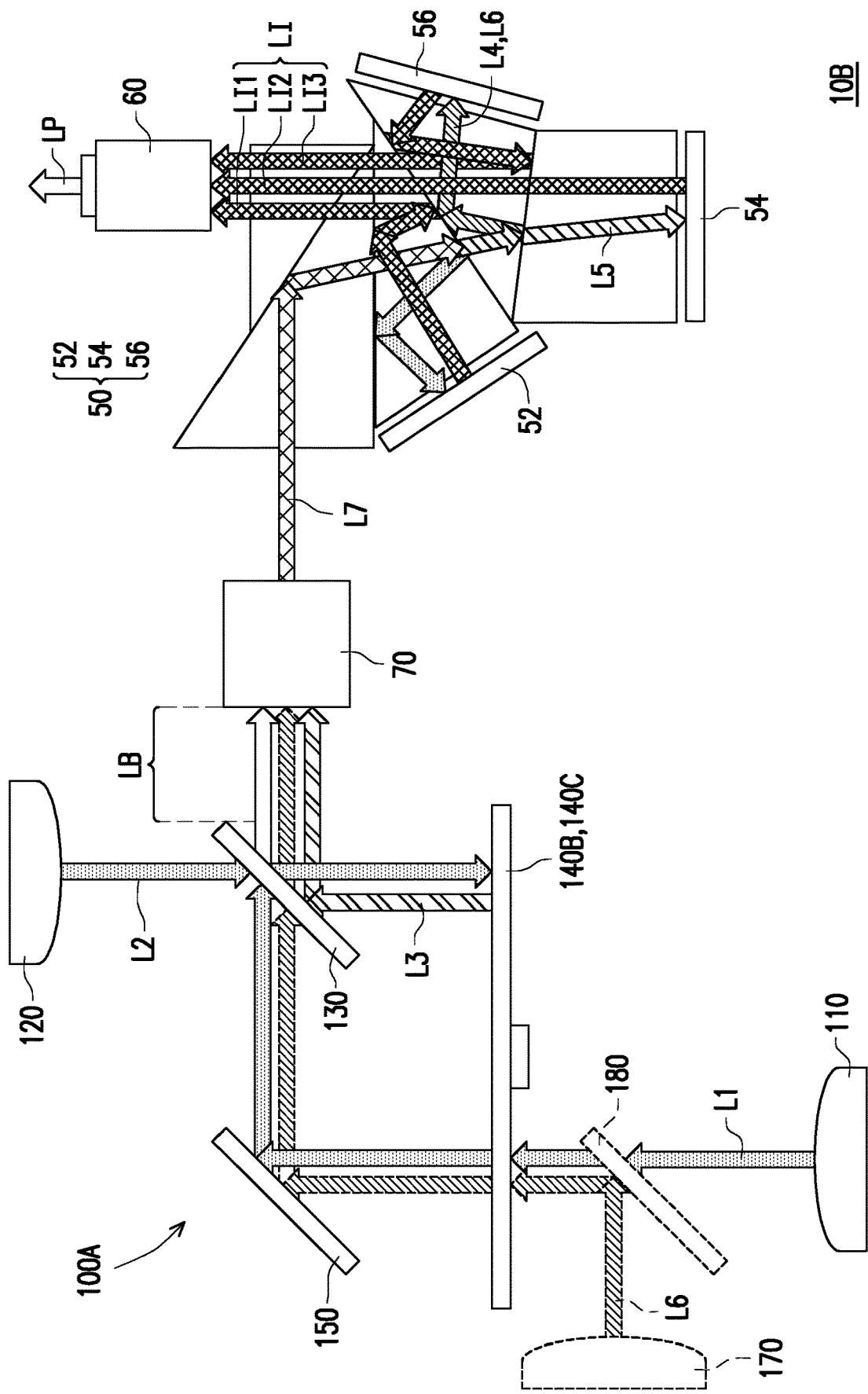
FIG. 11 is a schematic diagram illustrating a projection system according to another embodiment of the invention.
Figure 12:
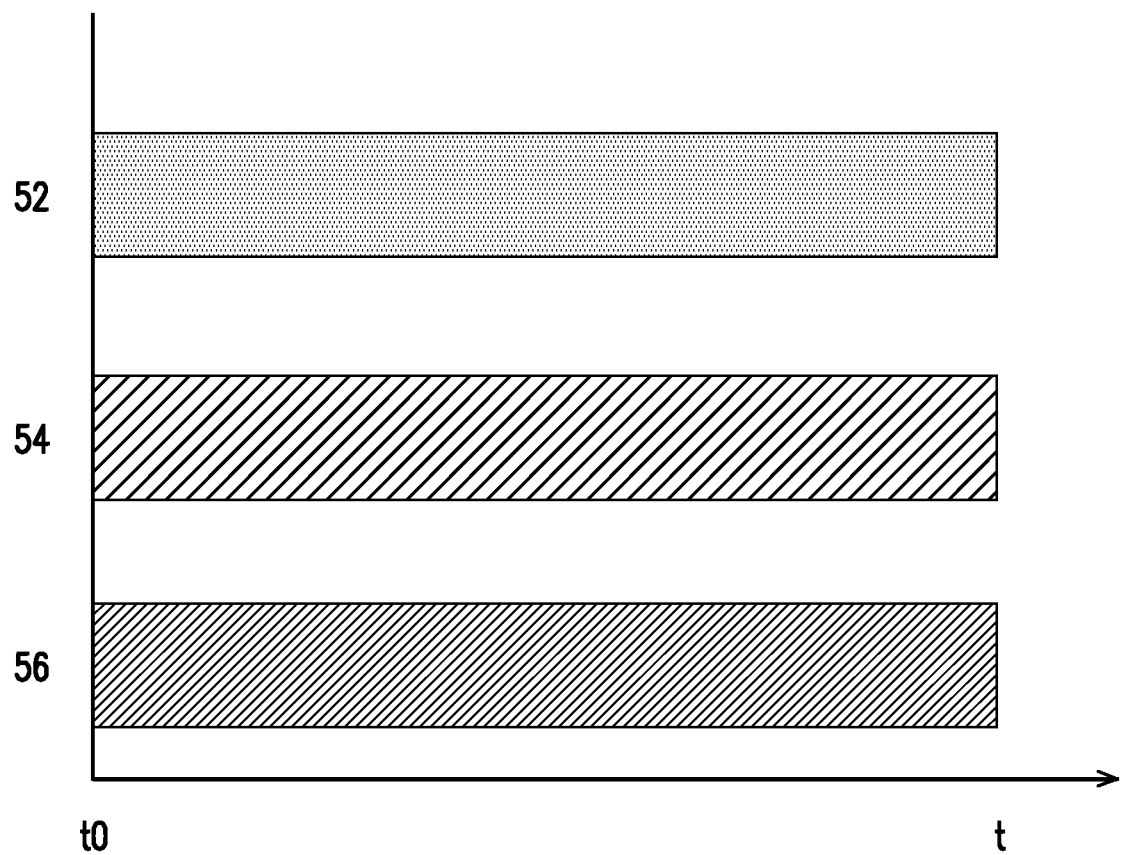
FIG. 12 is a timing chart of the projection apparatus depicted in FIG. 11.

FIG. 11 is a schematic diagram illustrating a projection system according to another embodiment of the invention. FIG. 12 is a timing chart of the projection apparatus depicted in FIG. 11. Referring to FIG. 11 and FIG. 12, a projection apparatus 10B of the embodiment is similar to the projection apparatus 10A illustrated in FIG. 8. However, the difference therebetween is as follows. In the embodiment, the at least one light valve 50 of the projection apparatus 10B includes a first light valve 52, a second light valve 54 and a third light valve 56, for example, the projection apparatus 10B using three DMDs (3-DMDs). Additionally, in the embodiment, the blue light source 110 and the excitation light source 120 are simultaneously in the turned-on, the turned-off or the power saving state, as illustrated in FIG. 12. As the blue light source 110 and the excitation light source 120 do not have to be changed to the turned-on, the turned-off or the power saving state according to different timing periods, the illumination light beam LB provided by the illumination system 100A passes through the light uniformizing element 70 and then generates a mixed light beam L7. The mixed light beam L7 may respectively form and provide the blue light beam L1, the green light beam L5 and the first red light beam L4 to the first light valve 52, the second light valve 54 and the third light valve 56 by means of light splitting of different optical elements in the projection apparatus 10B, such that the first light valve 52, the second light valve 54 and the third light valve 56 may respectively form the first sub image light beam LI1, the second sub image light beam LI2 and a third sub image light beam LI3 and provide them to the projection lens module 60.

Figure 13:
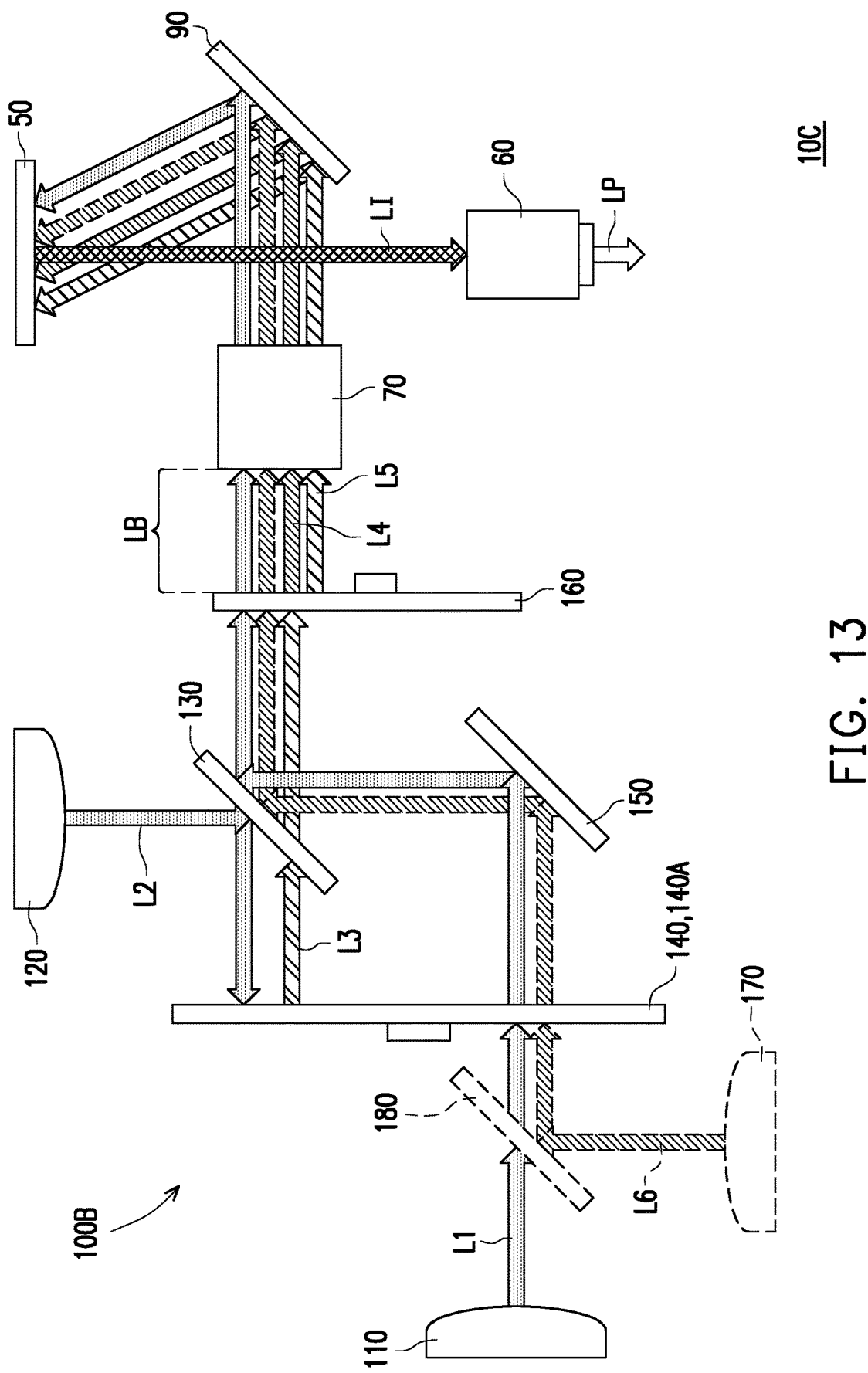
FIG. 13 is a schematic diagram illustrating a projection system according to another embodiment of the invention.
Figure 14:
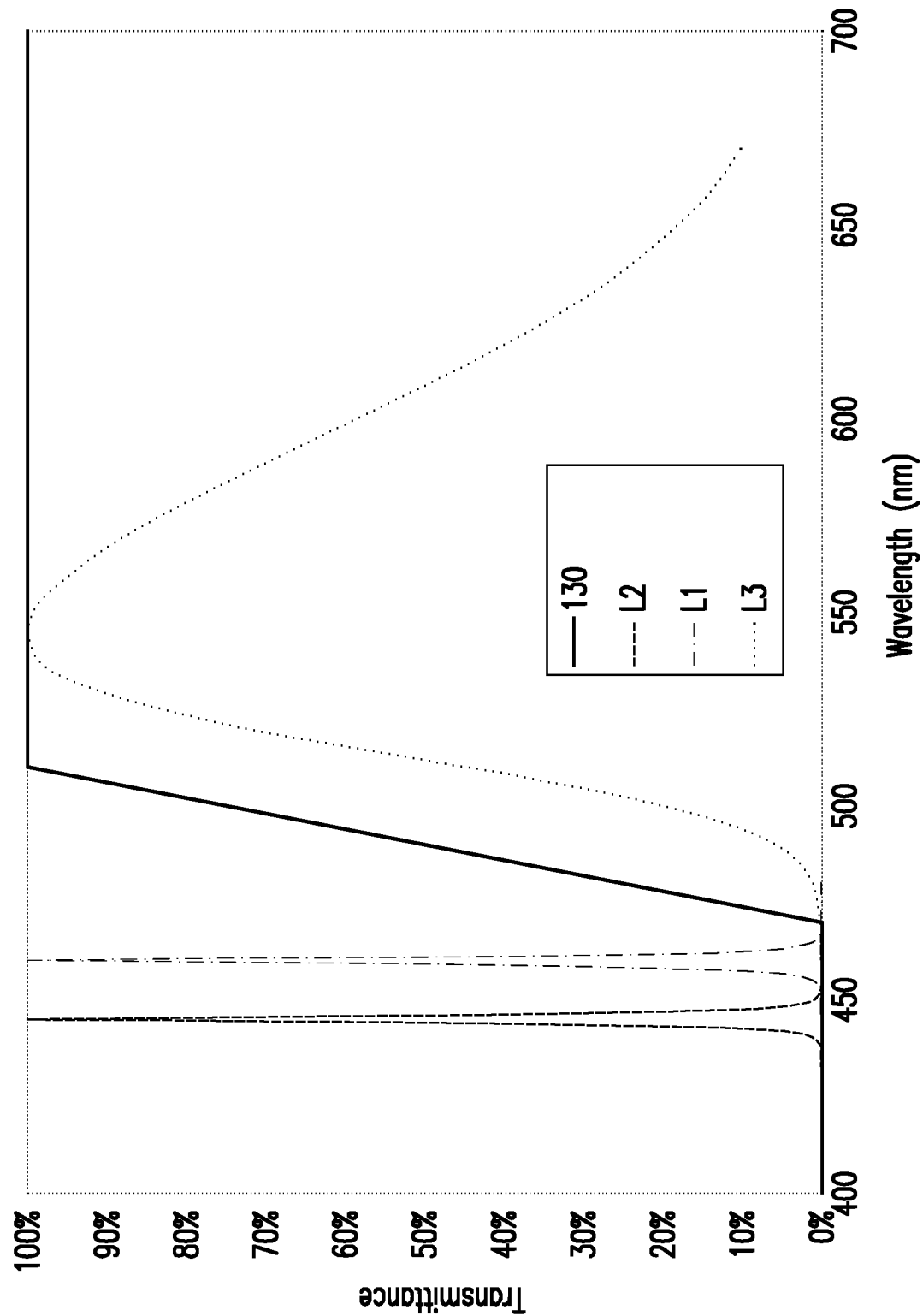
FIG. 14 is a spectrum diagram of the first light splitting element of the projection apparatus depicted in FIG. 13.
Figure 15:
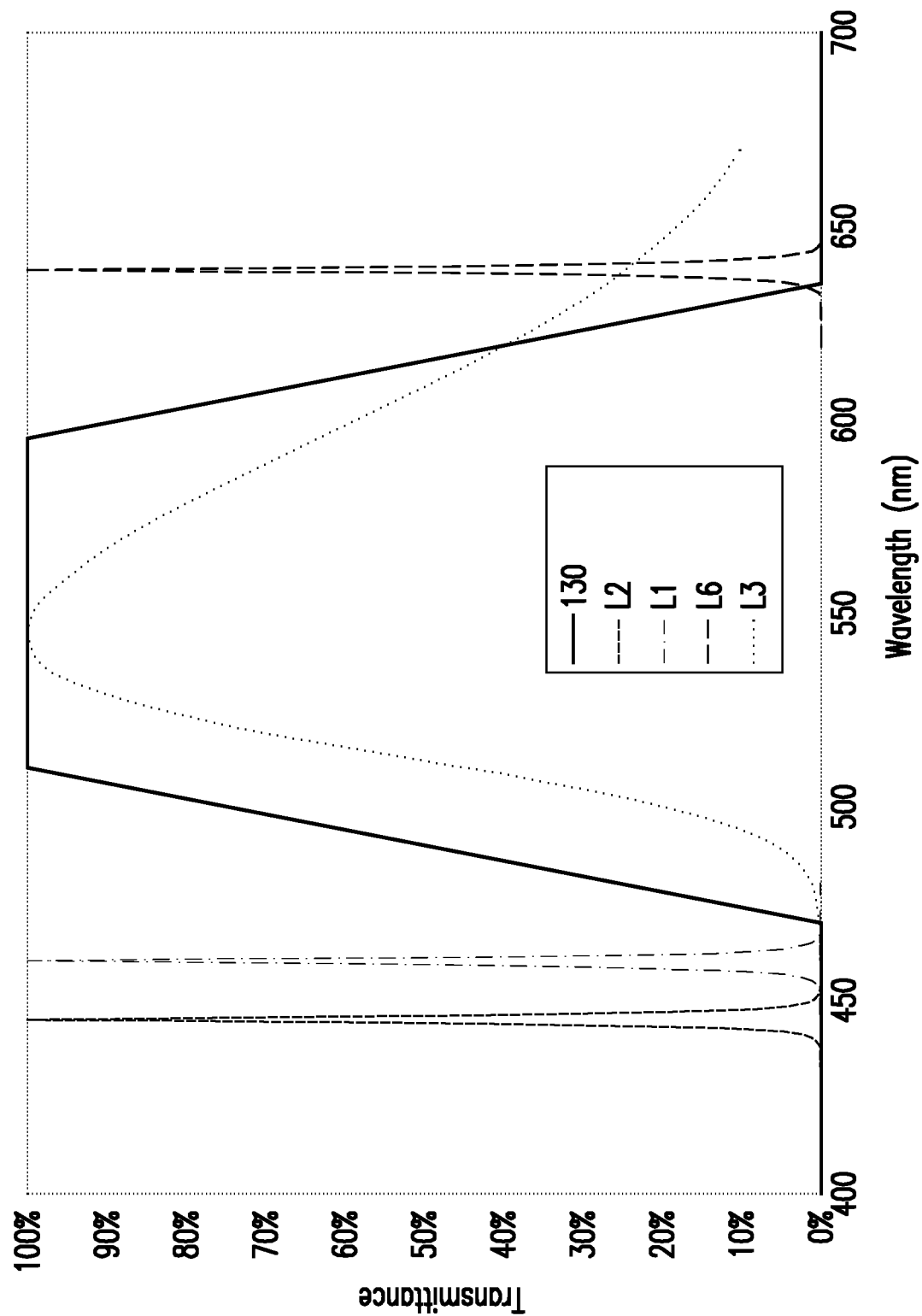
FIG. 15 is a spectrum diagram of the first light splitting element of the projection apparatus depicted in FIG. 13 according to another embodiment of the invention.

FIG. 13 is a schematic diagram illustrating a projection system according to another embodiment of the invention, FIG. 14 is a spectrum diagram of the first light splitting element of the projection apparatus depicted in FIG. 13, and FIG. 15 is a spectrum diagram of the first light splitting element of the projection apparatus depicted in FIG. 13 according to another embodiment of the invention. Referring to FIG. 13 to FIG. 15, a projection apparatus 10C of the embodiment is similar to the projection apparatus 10 illustrated in FIG. 1. However, the difference therebetween is as follows. In the embodiment, an illumination system 100B of the projection apparatus 10C is different from the illumination system 100 illustrated in FIG. 1. To be detailed, the first light splitting element 130 of the illumination system 100B of the embodiment is a dichroic mirror with blue reflect (DMB), as illustrated in FIG. 14. In the embodiment where the red light source 170 and the second light splitting element 180 are provided, the first light splitting element 130 uses a dichroic mirror with blue and red reflect (DMBR), as illustrated in FIG. 15.

Thus, the blue light beam L1 emitted by the blue light source 110 passes through the diffusion region of the wavelength conversion element 140 and is reflected to the light filter element 160 by the first light splitting element 130. The excitation light beam L2 emitted by the excitation light source 120 is reflected to the wavelength conversion region of the wavelength conversion element 140 by the first light splitting element 130 to generate the excited light beam L3. The excited light beam L3 passing through the second light filter region 164 is transmitted to the light filter element 160. When the projection apparatus 10C is used, teaching, suggestion and implementation instructions with respect to the detailed steps, the implementation thereof and the change of the color light according to the timing periods may be obtained based on the common knowledge in the technical field and thus, will not be repeated.

Figure 16:
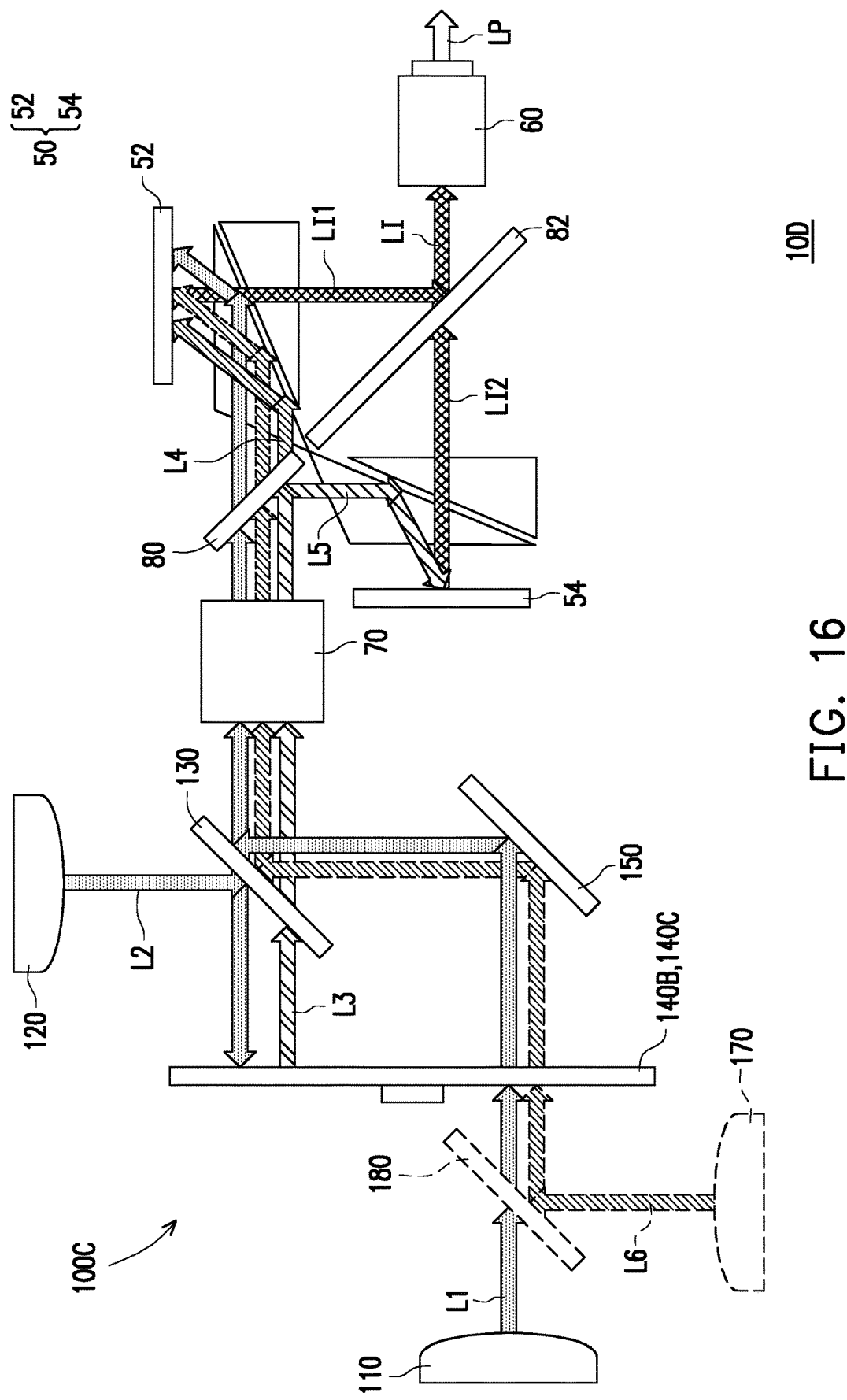
FIG. 16 is a schematic diagram illustrating a projection system according to another embodiment of the invention.

FIG. 16 is a schematic diagram illustrating a projection system according to another embodiment of the invention. Referring to FIG. 16, a projection apparatus 10D of the embodiment is similar to the projection apparatus 10A illustrated in FIG. 8. However, the difference therebetween is as follows. In the embodiment, an illumination system 100C of the projection apparatus 10D is different from the illumination system 100A illustrated in FIG. 8. To be detailed, the illumination system of the embodiment uses one similar to the illumination system 100B illustrated in FIG. 13. The difference therebetween only lies in the wavelength conversion element using the wavelength conversion elements 140B and 140C as the diffusion region and the wavelength conversion region which both are single continuous regions. When the projection apparatus 10D is used, teaching, suggestion and implementation instructions with respect to the detailed steps, the implementation thereof and the change of the color light according to the timing periods may be obtained based on the common knowledge in the technical field and thus, will not be repeated.

Figure 17:
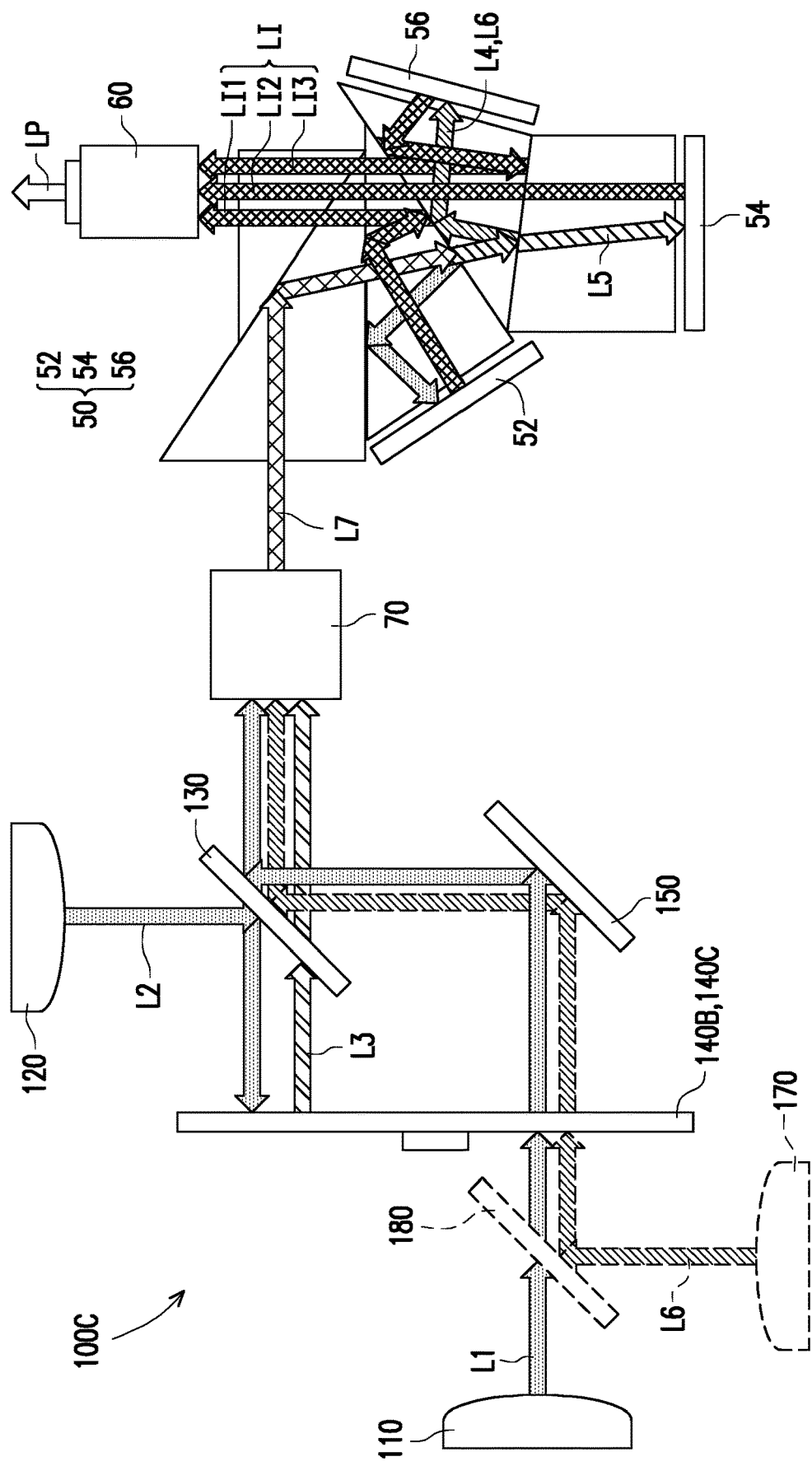
FIG. 17 is a schematic diagram illustrating a projection system according to another embodiment of the invention.

FIG. 17 is a schematic diagram illustrating a projection system according to another embodiment of the invention. Referring to FIG. 17, a projection apparatus 10E of the embodiment is similar to the projection apparatus 10B illustrated in FIG. 11. However, the difference therebetween is as follows. In the embodiment, an illumination system 100C of the projection apparatus 10E is different from the illumination system 100A illustrated in FIG. 11. To be detailed, the projection apparatus 10C of the embodiment uses one similar to the illumination system 100C illustrated in FIG. 16. When the projection apparatus 10E is used, teaching, suggestion and implementation instructions with respect to the detailed steps, the implementation thereof and the change of the color light according to the timing periods may be obtained based on the common knowledge in the technical field and thus, will not be repeated.

Based on the above, the embodiments of the invention achieve at least one of the following advantages or effects. In the embodiments of the invention, the wavelength conversion element is disposed on the transmission paths of the blue light beam and the excitation light beam and includes the diffusion region and the wavelength conversion region. Thus, the illumination system may provide the illumination light beam without being additionally disposed with a color wheel device, so as to simplify the structure of the projection apparatus and reduce the volume thereof.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system, comprising:
   a blue light source, configured to provide a blue light beam;
   an excitation light source, configured to provide an excitation light beam;
   a first light splitting element, disposed on transmission paths of the blue light beam and the excitation light beam; and
   a wavelength conversion element, disposed on the transmission paths of the blue light beam and the excitation light beam, and comprising a diffusion region and a wavelength conversion region, wherein
      in a first timing period, the excitation light beam passing through the first light splitting element is transmitted to the wavelength conversion region to be converted into an excited light beam,
      in a second timing period, the blue light beam passing through the diffusion region is transmitted to the first light splitting element, and
      the excited light beam comprises a first red light beam and a green light beam.

2. The illumination system of claim 1, wherein a wavelength of the blue light beam is greater than or equal to a wavelength of the excitation light beam.

3. The illumination system of claim 1, wherein the diffusion region and the wavelength conversion region are distributed in a concentric circle manner on the wavelength conversion element.

4. The illumination system of claim 1, wherein each of the diffusion region and the wavelength conversion region is a single continuous region.

5. The illumination system of claim 1, wherein the blue light source and the excitation light source are respectively located at opposite sides of the wavelength conversion element.

6. The illumination system according to claim 1, further comprising:
   a red light source, configured to provide a second red light beam; and
   a second light splitting element, disposed on the transmission path of the blue light beam and a transmission path of the second red light beam, wherein
   the second red light beam passing through the diffusion region is transmitted to the first light splitting element, and a turned-on state of the red light source is the same as that of the blue light source.

7. The illumination system of claim 1, wherein
   in the first timing period, the blue light source is in a turned-off state or a power saving state, and
   in the second timing period, the excitation light source is in the turned-off state or the power saving state.

8. The illumination system of claim 7, wherein
   in a third timing period, the excitation light source is in a turned-on state, and the blue light source is in the turned-off state or the power saving state.

9. The illumination system of claim 7, wherein
   in a third timing period, the excitation light source and the blue light source are in a turned-on state.

10. A projection apparatus for providing a projection light beam, comprising:
    an illumination system, adapted to provide an illumination light beam, and comprising:
       a blue light source, configured to provide a blue light beam;
       an excitation light source, configured to provide an excitation light beam;
       a first light splitting element, disposed on transmission paths of the blue light beam and the excitation light beam; and
       a wavelength conversion element, disposed on the transmission paths of the blue light beam and the excitation light beam, and comprising a diffusion region and a wavelength conversion region;
    at least one light valve, disposed on a transmission path of the illumination light beam, and configured to convert the illumination light beam into at least one image light beam; and
    a projection lens module, disposed on a transmission path of the at least one image light beam, and configured to form the at least one image light beam to the projection light beam, wherein
       in a first timing period, the excitation light beam passing through the first light splitting element is transmitted to the wavelength conversion region to be converted into an excited light beam,
       in a second timing period, the blue light beam passing through the diffusion region is transmitted to the first light splitting element, and
       the excited light beam comprises a first red light beam and a green light beam.

11. The projection apparatus of claim 10, wherein
    in the first timing period, the blue light source is in a turned-off state or a power saving state, and
    in the second timing period, the excitation light source is in the turned-off state or the power saving state.

12. The projection apparatus of claim 11, wherein the number of the at least one light valve is one, and the projection apparatus further comprises a light filter element disposed on the transmission path of the blue light beam and a transmission path of the excited light beam, and the light filter element comprises a first light filter region, a second light filter region and a transparent region, wherein
    the first timing period comprises a first sub timing period and a second sub timing period, in the sub first timing period, the excited light beam passing though the first light filter region is converted into the first red light beam, in the sub second timing period, the excited light beam passing through the second light filter region is converted into the green light beam, in the second timing period, the blue light beam passes through the transparent region, and in a third timing sequence, the excitation light source is in a turned-on state, and the blue light source is in the turned-off state or the power saving state.

13. The projection apparatus of claim 11, wherein the number of the at least one light valve is one, and the projection apparatus further comprises a light filter element disposed on the transmission path of the blue light beam and a transmission path of the excited light beam, and the light filter element comprises a first light filter region, a second light filter region and a transparent region, wherein the first timing period comprises a first sub timing period and a second sub timing period, in the sub first timing period, the excited light beam passing through the first light filter region is converted into the first red light beam, in the sub second timing period, the excited light beam passing through the second light filter region is converted into the green light beam, in the second timing period, the blue light beam passes through the transparent region, and in a third timing period, the excitation light source and the blue light source are in a turned-on state.

14. The projection apparatus of claim 10, wherein the at least one light valve comprises a first light valve and a second light valve, the projection apparatus further comprises a light filter disposed on a transmission path of the excited light beam, and configured to allow one of the first red light beam and the green light beam to pass through to be transmitted to the first light valve, and reflect and transmit the other one to the second light valve.

15. The projection apparatus of claim 10, wherein the at least one light valve comprises a first light valve, a second light valve and a third light valve, and the excitation light source and the blue light source are both in a turned-on state in the first timing period and the second timing period.

16. The projection apparatus of claim 10, further comprising:
a light uniformizing element, disposed on the transmission paths of the blue light beam and the excited light beam.

17. An operating method of the illumination system, comprising:
providing the illumination system as recited in claim 1,
in the first timing period, changing the blue light source to a turned-off state or a power-saving state, and changing the excitation light source to a turned-on state, so as to generate the first red light beam and the green light beam; and
in the second timing period, changing the excitation light source to the turned-off state or the power-saving state, and changing the blue light source to the turned-on state, so as to generate the blue light beam.

18. The operating method of claim 17, wherein the illumination system further comprises a third timing period, and the method further comprises:
in the third timing period, changing the blue light source to the turned-off state or the power-saving state, and changing the excitation light source to the turned-on state, so as to generate a yellow light beam.

19. The operating method of claim 17, wherein the illumination system further comprises a third timing period, and the method further comprises:
in the third timing period, changing the blue light source and the excitation light source to the turned-on state, so as to generate a white light beam.

20. An operating method of the illumination system, comprising:
providing the projection apparatus of claim 10,
in the first timing period, changing the blue light source to a turned-off state or a power-saving state, and changing the excitation light source to a turned-on state, so as to generate the first red light beam and the green light beam; and
in the second timing period, changing the excitation light source to the turned-off state or the power-saving state, and changing the blue light source to the turned-on state, so as to generate the blue light beam.

21. The operating method of claim 20, wherein the illumination system further comprises a third timing period, and the operation method further comprises:
in the third timing period, changing the blue light source to the turned-off state or the power-saving state, and changing the excitation light source to the turned-on state, so as to generate a yellow light beam.

22. The operating method of claim 20, wherein the illumination system further comprises a third timing period, and the method further comprises:
in the third timing period, changing the blue light source and the excitation light source to the turned-on state, so as to generate a white light beam.

23. An illumination system, comprising:
a blue light source, configured to provide a blue light beam;
an excitation light source, configured to provide an excitation light beam;
a first light splitting element, disposed on transmission paths of the blue light beam and the excitation light beam; and
a wavelength conversion element, disposed on the transmission paths of the blue light beam and the excitation light beam, and comprising a diffusion region and a wavelength conversion region, wherein
in a first timing period, the excitation light beam is reflected to the wavelength conversion region of the wavelength conversion element by the first light splitting element to generate an excited light beam,
in a second timing period, the blue light beam passing through the diffusion region is transmitted to the first light splitting element.

24. A projection apparatus for providing a projection light beam, comprising:
an illumination system, adapted to provide an illumination light beam, and comprising:
a blue light source, configured to provide a blue light beam;
an excitation light source, configured to provide an excitation light beam;
a first light splitting element, disposed on transmission paths of the blue light beam and the excitation light beam; and
a wavelength conversion element, disposed on the transmission paths of the blue light beam and the excitation light beam, and comprising a diffusion region and a wavelength conversion region;

at least one light valve, disposed on a transmission path of the illumination light beam, and configured to convert the illumination light beam into at least one image light beam; and a projection lens module, disposed on a transmission path of the at least one image light beam, and configured to fonn the at least one image light beam to the projection light beam, wherein in a first timing period, the excitation light beam is reflected to the wavelength conversion region of the wavelength conversion element by the first light splitting element to generate an excited light beam, in a second timing period, the blue light beam passing through the diffusion region is transmitted to the first light splitting element.

* * * * *